United States Patent [19]

Evans et al.

[11] Patent Number: 4,724,167

[45] Date of Patent: Feb. 9, 1988

[54] TREATED SILICA FILLERS AND PROCESS FOR MAKING THE SAME

[75] Inventors: Edwin R. Evans, Clifton Park; Lawrence G. Waters, Watervliet; Michael J. Rosko, Schaghticoke, all of N.Y.

[73] Assignee: General Electric Company, Waterford, N.Y.

[21] Appl. No.: 868,977

[22] Filed: May 30, 1986

[51] Int. Cl.⁴ .................... B05D 7/00; C08K 3/10
[52] U.S. Cl. ...................... 427/221; 428/405; 428/407; 524/588; 524/860; 528/901
[58] Field of Search ............ 427/221; 428/405, 407; 524/588, 860; 528/901

[56] References Cited

U.S. PATENT DOCUMENTS

| | | | |
|---|---|---|---|
| 4,433,096 | 3/1983 | Bokerman et al. | 524/783 |
| 4,448,927 | 5/1984 | Falender et al. | 524/860 |
| 4,454,288 | 6/1984 | Lee et al. | 524/860 X |
| 4,529,774 | 7/1985 | Evans et al. | 524/860 |
| 4,567,231 | 1/1986 | Huebner et al. | 524/837 |
| 4,584,341 | 4/1986 | Huebner et al. | 524/837 |
| 4,585,821 | 4/1986 | Progneaux et al. | 524/425 |

Primary Examiner—Michael R. Lusignan
Attorney, Agent, or Firm—John W. Harbour

[57] ABSTRACT

A treatment for finely divided silica reinforcing fillers is provided which utilizes low temperature and hydroxy or alkoxy containing diorganopolysiloxane as the treating agent. The treatment of fillers in this manner facilitates the manufacture and incorporation into silicone rubbers.

12 Claims, No Drawings

TREATED SILICA FILLERS AND PROCESS FOR MAKING THE SAME

This invention relates to a method to produce certain finely divided silica fillers useful to reinforce silicone elastomeric compositions. More particularly, this invention relates to a method for surface treating silica fillers which renders them more compatible in silicone elastomeric compositions.

BACKGROUND OF THE INVENTION

Silicone elastomers have been widely valued for their resistance to moisture and their high and low temperature stability. Silicone elastomers have been developed which exhibit excellent handling characteristics, as in U.S. Pat. No. 2,938,009 (Lucas), mechanical properties, as in U.S. Pat. Nos. 3,635,743 (Smith) and 3,847,848 (Beers), and solvent resistance, as in U.S. Pat. No. 4,029,629 (Jeram). All of the above patents are incorporated herein by reference. These characteristics are accomplished through the use of treated fillers, usually treated finely divided silica, or by modifying the curable siloxane polymers.

Treating silica fillers with silicone treating agents has been proposed, see U.S. Pat. No. 4,355,121 and U.S. Pat. No. 4,469,522, but implementation of these concepts has been resisted because of the toxicity of the treating agents (i.e., fluoroalkyl functional cyclic polysiloxanes) and the substantial modifications of equipment their use would entail.

Another method for treating silica fillers with silicone treating agents is disclosed in U.S. Pat. No. 4,529,774 (Evans et al.). Therein silica fillers are exposed in the vapor phase to the direct hydrolyzate of diorganosilanes at temperatures of from 240° C. to about 310° C. These direct hydrolyzates are compounds comprising cyclic and linear diorganopolysiloxanes. The high temperatures utilized make both the equipment and energy necessary to carry out this method costly. Additionally, reproducibility by this method is poor.

A method has been discovered by which finely divided silica fillers can be treated with diorganopolysiloxanes at lower temperatures and subsequently at lower cost. Furthermore, such method calls for process conditions that allow for the overall simplification of producing treated silica fillers.

Accordingly, it is an object of the present invention to provide a method for treating silica filler which allows for the use of lower reaction temperatures and improved reproducibility.

DETAILED DESCRIPTION OF THE INVENTION

Briefly, according to the present invention there is provided a process for treating finely divided silica reinforcing fillers comprising contacting the filler at a temperature of at most about 210° C. for a sufficient time to complete the reaction with condensable diorganopolysiloxane which is in the liquid phase and which has hydroxy or alkoxy functionality readily reactive with the silica surface below about 210° C.

The fillers treated by the process of the present invention are finely divided reinforcing fillers which may have free hydroxyl groups in the form of either Si-bonded functional groups or adsorbed moisture, depending on their method of preparation. The Si-bonded hydroxyl groups may also have been converted to other functional groups, such as alkoxy, in their manufacture.

These silica fillers are reinforcing fillers in contrast to other fillers of non-reinforcing, non-structure-forming type, such as titanium dioxide or calcium carbonate. Examples of such silica fillers may be found described in U.S. Pat. Nos. 2,541,137; 2,610,167 and 2,657,149, as well as French Pat. Nos. 1,025,837 (issued 1953) and 1,090,566 (issued 1955). Such structure-causing fillers may be slightly acidic or alkaline (i.e., have pH's slightly below or above 7) depending upon the method of manufacture, and may be obtained through the aerosolaerogel process, by fuming processes such as by the vapor phase burning of silicon tetrachloride or ethyl silicate, by precipitation means, etc. Commercially available fumed silicas include CAB-O-SIL ® (Cabot Corp.) and AEROSIL ® (Degussa, Inc.) Fumed silica is preferred.

Condensable diorganopolysiloxanes for use herein must at some temperature less than 210° C. be liquids and have hydroxy or alkoxy functionality which will readily react with the silica surface. Insufficiently reactive condensable diorganopolysiloxanes can be made readily reactive with the silica surface by the addition of condensation promoters such as tin soaps, stannous salts, and Lewis acids. These condensation promoters can be added so long as they do not promote unwanted side reactions such as polymerization evidenced by formation of gum balls. Although the hydroxy or alkoxy functionality may occur anywhere on the polymer, these diorganopolysiloxanes are preferably hydroxy terminated with no condensable substitution on chain to prevent the formation of crosslinked gum balls. Preferred condensable diorganopolysiloxanes have the general formula:

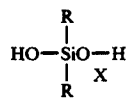

wherein X has a value of from about 1 to 20 and R is a monovalent substituted or unsubstituted hydrocarbon radical. Preferably, the condensable diorganopolysiloxanes are all hydroxy terminated diorganopolysiloxanes of the above formula. It is preferred that X in the above formula be between about 2 and 10 and most preferably about 2 or 3 and the R of the above formula is generally at least about 50% by number methyl with the balance selected from alkyl, such as methyl, ethyl, propyl, butyl, hexyl, and the like; alkenyl, such as vinyl and the like; aryl, such as phenyl and the like; cycloalkyl, such as cyclopentyl, cyclohexyl, cycloheptyl, and the like; halogenated alkyl, such as 3-chloropropyl, 4-chlorobutyl, 3,3-difluoroallyl, 3,3,3-trifluoropropyl and the like; halogenated aryl, such as 3-fluorophenyl and the like; halogenated cycloalkyl; and the like. Where R is halogenated, the preferred R is —$CH_2CH_2R^2$ wherein $R^2$ is perfluoroalkyl such as perfluoromethyl, perfluoroethyl, perfluorohexyl, and the like. R should have no more than about 10 carbon atoms.

The above hydroxy terminated diorganopolysiloxanes may be produced by methods well known to the art. In one method, diorganodihalogensilanes are partially hydrolyzed to form a mixture of cyclic and linear diorganopolysiloxanes. Further details of this method may be found in U.S. Pat. Nos. 2,737,506 (Hurd, et al.), 3,937,684 (Razzano) 4,341,888 (Razzano) and 4,529,774 (Evans, et al.) all incorporated herein by reference.

In another method, cyclic diorganopolysiloxanes are heated in an organic solvent in the presence of a H+ treated clay catalyst to open the ring and produce a hydroxy terminated diorganopolysiloxane. In this method, composition of the diorganopolysiloxane product can be controlled by controlling the purity and ring size of the cyclic diorganopolysiloxane feedstock. This second method is preferred due to the purity and variety of the cyclic polydiorganosiloxanes available.

According to the method of the present invention, the filler is treated by heating in the presence of condensable diorganopolysiloxanes in the liquid phase at a temperature of up to about 210° C. for a sufficient perod of time to achieve the desired treatment. Generally, above about 110° C. the heating or treatment time varies from about 1 to about 4 hours with about 2 hours being the common practice. Preferred reaction temperatures vary from 130° C. to about 180° C. with the optimum reaction temperatures ranging from about 140° C. to about 160° C. The filler may be preheated under vacuum to remove water and volatiles may be removed during the reaction by either vacuum or nitrogen purge. Mixing the filler during treatment improves mass transfer and prevents agglomeration.

The treatment may be carried out in either a batch or continuous flow process. The condensable diorganopolysiloxanes may be present in large excess or present only in that amount to be applied to the silica. Where a large excess of condensable diorganosiloxane is present then, of course, reaction time could be used to control surface treatment and it would be necessary to employ various separation techniques to remove the treated silica from the excess condensable diorganosiloxane. Where only that amount of condensable diorganosiloxane is employed which is to be applied to the silica, or slight excess, then a non-condensable diluent can be employed to act as a carrier liquid or viscous medium and facilitate mass transfer. Non-condensable diluent must be miscible with the condensable diorganopolysiloxane in order to facilitate the treatment process and, of course it must not condense or otherwise react with the silica surface or condensable diorganopolysiloxane at the temperature of treatment. Generally, the amount of condensable diorganopolysiloxane which is applied to the silica ranges from about 5 to about 50 parts by weight, more preferably from about 17 to about 30 parts by weight, and most preferably, from about 19 to about 25 parts by weight for each 100 parts by weight silica. The amount of non-condensable diluent employed varies with circumstance but should be a sufficient amount to insure mass transfer in the reaction mixture. An excessive amount of non-condensable diluent is employed where dilution of the condensable diorganopolysiloxane unreasonably slows reaction times. A suitable weight ratio of condensable diorganopolysiloxane to non-condensable diluent ranges from about 1/100 to about 9/1.

The treated silica fillers prepared according to the present invention may be used in heat- or room temperature curable silicone rubbers system or in any manner that finely divided silica fillers are commonly used in the art; but because the treated fillers disclosed herein have shown a compatability with silicone gum, leading to processing improvements, use in silicone elastomer compositions, such as disclosed in U.S. Pat. No. 3,179,619 (Brown), U.S. Pat. No. 4,029,629 (Jeram) and U.S. Pat. No. 4,585,848 (Evans, et al.) (all incorporated by reference), is especially contemplated.

The amount of treated silica filler used in combination with curable (vulcanizable) organopolysiloxane elastomer compositions may be varied within wide limits, for instance, from 10 to 100 weight percent of the filler based on the weight of the curable organopolysiloxane elastomer. The exact amount of filler used will depend on such factors as, for example, the intended application of the cured elastomer composition, the density of the silica filler employed, the type or organopolysiloxane elastomer employed, etc. By way of illustration, when curable silicone polymer gums are used, reinforcing with about 19-25 weight percent of the treated filler disclosed herein has resulted in marked improvement in tear strength and compression set. Judicious selection of materials and simple experimentation is contemplated to achieve optimal performance for a given situation.

Other fillers may of course be used in conjunction with the treated silica herein. These include, for example, untreated silica filler, titanium dioxide, lithopone, zinc oxide, zirconium silicate, iron oxide, diatomaceous earth, finely divided sand, calcium carbonate, etc.

All patents and applications mentioned above are hereby incorporated by reference.

In order that persons skilled in the art may better understand how to practice the present invention the following examples are offered by way of illustration and not by way of limitation.

EXAMPLES

Examples 1 and 2

To a clean 1420 ml dough mixer was charged 20 grams of a condensable diorganopolysiloxane treating agent being a silanol terminated methyl-3,3,3-trifluoropropylpolysiloxane fluid having a hydroxy end-group content of 6.8% by weight and 401.5 grams of a non-condensable diluent consisting of 380 grams vinyl terminated methyl-3,3,3-trifluoropropylsiloxane gum with a Williams Plasticity (3' value at 25° C.) of 200±20 and vinyl end-group content of 0.01-0.20% by weight, 20 grams vinyl terminated methyl-3,3,3-trifluoropropylsiloxane gum having a vinyl on chain content of 1.6% by weight (as $CH_2=CH-$) and a Williams Plasticity (3' value at 25° C.) of 190±20, 0.5 grams M-stopped polydimethyl siloxane gum with 4.2% by weight vinyl on chain and 1.0 gram of a vinyl terminated polydimethylsiloxane plasticizer. This mixture was mixed at a shear rate of 20–45 rpm for 30 minutes then heated to 50° C. while under a blanket of nitrogen. Finely divided fumed silica having a surface area of 200±20 $m^2$/gram was added incrementally with time given between each addition for the batch to mass. The total weight amounts of fumed silica added is shown in Table 1. When the filler addition was completed and the batch was fully massed, the temperature was increased to 120°–160° C. and held for 1 to 3 hours under a nitrogen purge rate of 1 ∝ 6 $ft^3$/hr. The nitrogen purge rate was then increased to 10–15 $ft^3$/hr for 2–6 hours. The batch temperature was finally reduced to less than 80° C. prior to the addition of 0.7 grams of a stabilizer, cerium hydroxide having a purity of 90.5% and a sieve size of +250 mesh. Rather than separating the non-condensable diluent gums from the treated silica, the gums are cured by adding Lupersol 101 curing agent, 2,5-dimethyl-2,5-di(t-butylperoxy)hexane, in the proportion of 0.75 grams/100 grams of silica plus diluent gum and subsequently curing for 15 min. at 177° C. followed by a post bake at 204° C. for 4 hours.

Control

To a clean 1420 ml dough mixer was charged 412.5 grams of gum and additives consisting of 380 grams vinyl terminated methyl-3,3,3-trifluoropropylsiloxane gum with a Williams Plasticity (3' value at 25° C.) of 200±20 and a vinyl end-group content of 0.01–0.20% by weight, 20 grams vinyl terminated methyl-3,3,3-trifluoropropylsiloxane gum having a vinyl on chain content of 1.6% by weight (as $CH_2=CH-$) and a Williams Plasticity (3' value at 25° C.) of 190±20, 0.5 grams M-stopped polydimethylsiloxane gum with 4.2% by weight vinyl on chain and 12 grams process aid, a silanol terminated polydimethylsiloxane telomer where the average chain contains 5 siloxane units. This mixture was mixed at a shear rate of 20–45 rpm for 30 minutes then heated to 50° C. While under a blanket of nitrogen 120 grams finely divided, treated, fumed silica which had a surface area prior to treatment of 200±20 $m^2$/gram was added incrementally with time given between each addition for the batch to mass. Treatment of the fumed silica had been carried out according to U.S. Pat. No. 4,529,774. Specifically, the fumed silica had been dried, and contracted at 280°–300° C. for 8 hours with fluorosilicone hydrolyzate being a mixture of fluorosilicone telomeric silanol and fluorosilicone cyclics, in the vapor phase. Subsequently, the residual fluorosilicone hydrolyzate had been blown off and the treated fumed silica devolatilized for 10 hours at 300° under nitrogen purge. When the filler addition was completed and the batch was fully massed, the temperature was increased to 120°–160° C. and held for 1 to 3 hours under a nitrogen purge rate of 1–6 $ft^3$/hr. The batch temperature was finally reduced to 80° C. prior to the addition of 0.7 grams of a stabilizer, cerium hydroxide having a purity of 90.5% and a sieve size of +250 mesh. The gum and fumed silica mixture was cured identically to Example 1 and 2.

TABLE I

|  | 1 | 2 | C |
|---|---|---|---|
| Treating agent, grams | 20 | 20 | — |
| Diluent (gum & additives), grams | 401.5 | 401.5 | 412.5 |
| Fumed silica, grams | 100 | 80 | 120 |
| Shore A | 42 | 38 | 40 |
| Tensile, psi | 1665 | 1615 | 1500 |
| Elongation % | 465 | 510 | 450 |
| Die B Tear, pi | 165 | 150 | 170 |
| Spec. grav. | 1.42 | 1.426 | 1.42 |
| Comp. Set., Method B, 22 hours/177° C., % | 14.0 | — | 18.0 |
| Processability | Very Good | Very Good | Very Good |

As seen in Table 1, fumed silica treated according to the present invention produces a polydiorganosiloxane rubber having at least as good a property profile as pretreated fumed silica of the prior art.

Examples 3 and 4

To a clean 1420 ml dough mixer was charged hydrolyzate fluid, prepared according to U.S. Pat. No. 4,529,774 from dichloromethyl-3,3,3-trifluoropropyl silane, containing non-condensable cyclopolysiloxanes in addition to condensable telomeric silanol as shown in Table 2 and 401.5 grams of a non-condensable diluent consisting of 380 grams vinyl terminated methyl-3,3,3-trifluoropropylsiloxane gum with a Williams Plasticity of (3' value at 25° C.) of 200±20 and vinyl end-group content of 0.01–0.20% by weight, 20 grams vinyl terminated methyl-3,3,3-trifluoropropylsiloxane gum having a vinyl on chain content of 1.6% by weight (as $CH_2=CH-$) and a Williams Plasticity (3' value at 25° C.) of 190±20, 0.5 grams M-stopped polydimethylsiloxane gum with 4.2% by weight vinyl on chain and 1.0 gram of a vinyl terminated polydimethylsiloxane plasticizer. This mixture was mixed at a shear rate of 20–45 rpm for 30 minutes then heated to 50° C. While under a blanket of nitrogen 112 grams of finely divided fumed silica having a surface area of 200±20 $m^2$/gram was added incrementally with time given between each addition for the batch to mass. When the filler addition was completed and the batch was fully massed the temperature was increased to 120°–160° C. and held for 1 to 3 hours under a nitrogen purge rate of 1–6 $ft^3$/hr. The nitrogen purge rate was then increased to 10–15 $ft^3$/hr for 2–6 hours. The batch temperature was finally reduced to less than 80° C. prior to the addition of 0.7 grams of a stabilizer, cerimum hydroxide having a purity of 90.5% and a sieve size of +250 mesh. The non-condensable cyclopolysiloxanes were substantially removed during nitrogen purge. Rather than separating the treated silica from the non-condensable diluent gums, the gums are cured by adding LUPERSOL 101 curing agent, 2,5-dimethyl-2,5-di(t-butylperoxy)hexane, in the proportion of 0.75 grams/100 grams of silica plus diluent gum and subsequently press curing for 15 min. at 177° C. followed by post bake at 204° C. for 4 hours.

TABLE 2

|  | 3 | 4 |
|---|---|---|
| Hydrolyzate fluid, grams | 28 | 44.8 |
| Diluent (gum & additives), grams | 401.5 | 401.5 |
| Fumed silica, grams | 112 | 112 |
| Hydrolyzate fluid, silanol/cyclic, weight ratio | 70/30 | 45/55 |
| Shore A | 43 | 42 |
| Tensile, psi | 1545 | 1545 |
| Elongation % | 480 | 515 |
| Die B Tear, pi | 170 | 165 |
| Spec. grav. | 1.424 | 1.416 |
| Processability | Very Good | Very Good |

Table 2 shows that the hydrolyzate treating agent of the prior art may be used under the treatment conditions of the present invention to produce treated silica with at least equivalent properties.

Examples 5–7

To a clean 1420 ml dough mixer was charged hydrolyzate fluid, prepared according to U.S. Pat. No. 4,529,774 from dichloromethyl-3,3,3-trifluoropropyl silane, containing non-condensable cyclopolysiloxanes in addition to condensable telomeric silanol as shown in Table 3 and 416 grams of a non-condensable diluent consisting of silanol terminated methyl-3,3,3-trifluoropropylsiloxane gum having a Williams Plasticity (3' value at 25° C.) of 200±30 and a vinyl on chain content of 0.06–0.07% by weight and 16 grams of a trimethyl siloxy stopped polydimethylsiloxane gum having a Williams Plasticity of 190±20 and a vinyl on chain content of 4.2% by weight (as $CH_2=CH-$). The mixture is agitated at a shear of 20-50 rpms while heating to 50° C. under a nitrogen blanket. After 30 minutes of mixing, 92 grams of finely divided silica was added incrementally with time given between each addition for the batch to mass. When filler addition was completed and the batch was fully massed, the temperature was increased to 140°-160° C. for 1-3 hours with a nitrogen purge rate of 1-6 ft³/hr. The nitrogen purge rate was then increased to 10-15 ft³/hr for 2-6 hours. The batch temperature was finally reduced to less than 80° C. and 1.0 gram titanium dioxide was added along with 0.2 grams of iron octoate stabilizer, iron-2-ethylhexanoate 6% by weight in mineral spirits. The non-condensable cyclopolysiloxanes were substantially removed during nitrogen purge. Rather than separating the treated silica from the non-condensable diluent gums, the gums are cured by adding CADOX TS-50 curing agent, 2,4-dichlorobenzoylperoxide in the proportion of 1.6 grams/100 grams of silica plus diluent gum and subsequently press curing for 15 minutes. at 124° C. and post baking for 4 hours at 204° C.

TABLE 3

|  | 5 | 6 | 7 |
|---|---|---|---|
| Hydrolyzate fluid, grams | 40 | 52 | 66 |
| Diluent (gum & additives), grams | 416 | 416 | 416 |
| Fumed silica, grams | 92 | 92 | 92 |
| Hydrolyzate fluid, hydroxy end-group content, wght % | 1.7 | 1.7 | 1.7 |
| Shore A | 38 | 40 | 40 |
| Tensile, psi | 1285 | 1475 | 1290 |
| Elongation % | 450 | 448 | 460 |
| Die B Tear, pi | 96 | 98 | 100 |
| Spec. grav. | 1.394 | 1.395 | 1.393 |
| Comp. Set., Method B, 22 hours/149° C., % | 20.6 | 16.5 | 18.0 |
| Processability | Good | Very Good | Partitions on mill and sticks |

What is claimed is:

1. A process for treating finely divided silica reinforcing fillers comprising contacting said filler at a temperature of at most about 210° C. for a sufficient time to complete the reaction with from about 5 to about 50 parts by weight condensable diorganopolysiloxane which is in the liquid phase for each 100 parts by weight said silica reinforcing fillers, said condensable diorganopolysiloxane comprising compounds of the general formula:

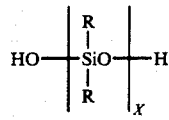

wherein X has a value of from about 1 to about 20 and R is a monovalent substituted or unsubstituted hydrocarbon radical.

2. The process of claim 1 wherein from about 17 to about 30 parts by weight condensable diorganopolysiloxane is contacted with each 100 parts by weight filler.

3. The process of claim 1 wherein X has a value of from about 3 to about 10.

4. The process of claim 1 wherein R is at least about 50% by number methyl with the balance selected from the group consisting of alkyl, alkenyl, aryl, cycloalkyl, and halogenated derivatives thereof.

5. The process of claim 1 wherein said filler is fumed silica.

6. The process of claim 1 wherein said time is from about 1 to about 3 hours.

7. The process of claim 1 wherein said condensable diorganopolysiloxane has halogenated organic substitution.

8. The process of claim 1 wherein said condensable diorganopolysiloxane is mixed with a non-condensable diluent.

9. The process of claim 8 wherein said non-condensable diluent is a diorganopolysiloxane.

10. The process of claim 9 wherein said diorganopolysiloxane is selected from the group consisting of vinyl end-stopped organopolysiloxane gum, silanol end-stopped organopolysiloxane gum and cyclodiorganopolysiloxane.

11. The process of claim 8 wherein the weight ratio of condensable diorganopolysiloxane to non-condensable diluent ranges from about 1/100 to about 9/1.

12. The process of claim 7 wherein said halogenated organic substitution is perfluoroalkyl.

* * * * *